United States Patent [19]

Hiller

[11] 3,950,251

[45] Apr. 13, 1976

[54] FILTER WITH QUICK-CONNECT COUPLING

[75] Inventor: Donald E. Hiller, Santa Barbara, Calif.

[73] Assignee: Rayne International, Santa Barbara, Calif.

[22] Filed: Mar. 25, 1974

[21] Appl. No.: 454,405

[52] U.S. Cl. ............... 210/232; 210/266; 210/282; 210/287; 210/288; 210/315; 210/338; 210/440; 210/443; 210/447

[51] Int. Cl.² ........................................ B01D 27/08

[58] Field of Search ............ 210/39, 232, 266, 282, 210/283, 287, 288, 315, 338, 440, 443, 444, 447, 137, 346; 285/137 R, 325

[56] References Cited
UNITED STATES PATENTS

| | | | |
|---|---|---|---|
| 1,231,928 | 7/1917 | Miller et al. ................. | 285/137 R |
| 1,646,377 | 10/1927 | Sweetland et al. ........... | 210/346 X |
| 2,475,468 | 7/1949 | Andrews ..................... | 285/137 R |
| 2,867,328 | 1/1959 | Sorensen .................... | 210/443 X |
| 3,126,335 | 3/1964 | Stipe .......................... | 210/266 X |
| 3,289,847 | 12/1966 | Rothemund ................. | 210/282 X |
| 3,399,776 | 9/1968 | Knuth ........................ | 210/444 X |
| 3,454,502 | 7/1969 | Hiltgen et al. ............... | 210/39 X |
| 3,595,397 | 7/1971 | Abos .......................... | 210/232 |
| 3,705,651 | 12/1972 | Klein ......................... | 210/282 |

FOREIGN PATENTS OR APPLICATIONS

| | | | |
|---|---|---|---|
| 2,064,763 | 7/1971 | France ........................ | 210/282 |

Primary Examiner—Charles N. Hart
Assistant Examiner—Robert G. Mukai
Attorney, Agent, or Firm—Christie, Parker & Hale

[57] ABSTRACT

A filtration assembly useful in a household water-chilling system and having a filter with concentric cylindrical activated-charcoal elements supported between inner and outer porous plastic tubes. The filter is contained in a housing having a cover with radiused inlet and outlet ports. A coupling or adapter block having captive O-rings seals mates with the cover ports to conduct water through the filter. The block and cover are self aligning, and are positioned so no vertical clearance space is required to separate the filtration assembly from the block when the filter is serviced.

5 Claims, 6 Drawing Figures

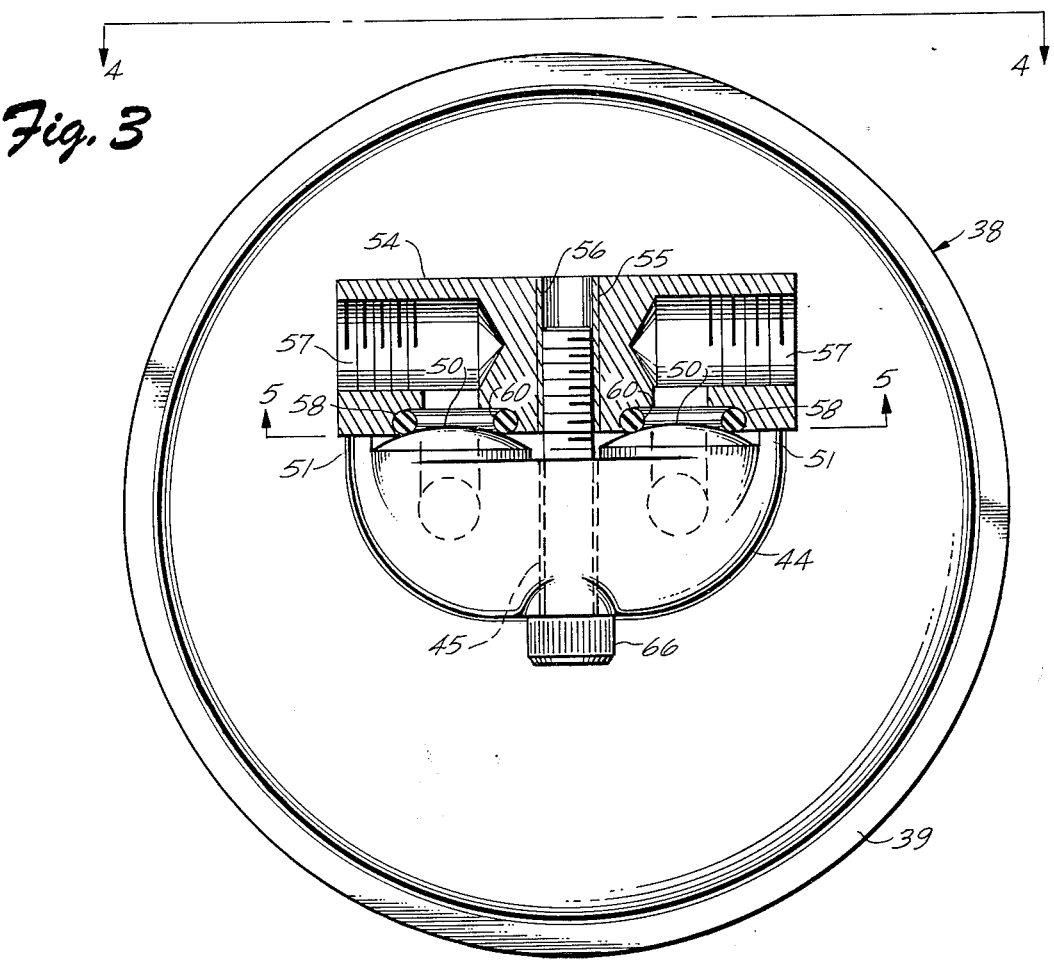
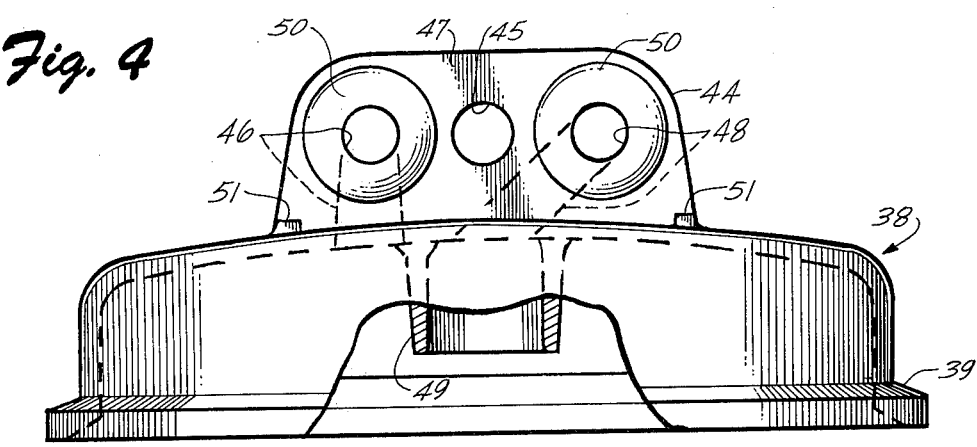
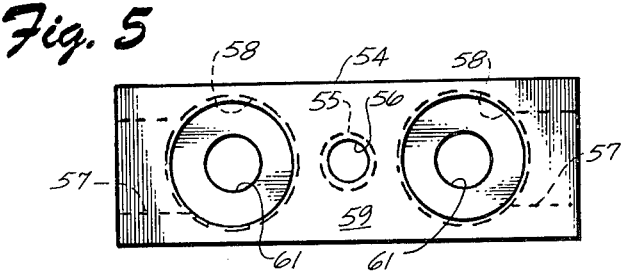
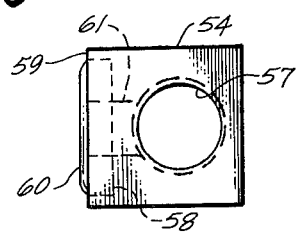

FILTER WITH QUICK-CONNECT COUPLING

BACKGROUND

Home water coolers are used to provide a source of chilled and filtered water for drinking and preparation of beverages. Water from regular utility lines is filtered to remove particulates and unpleasant tasting substances, and is delivered to a sink-mounted valve after passing through a chilling unit. These coolers are popular in many households as a replacement for bottled-water units which require handling of bulky water containers.

The filtration assembly of this invention is well suited for use in home water coolers, and provides effective filtering of particulates and other impurities from chlorinated household water. The assembly is compact, and is designed for under-sink floor mounting without special supporting brackets or similar hardware. A typical water-cooler system in which the invention is useful is described in my co-pending U.S. patent application Ser. No. 438,869 filed Feb. 1, 1974.

A quick-connect coupling is plumbed into the water line between the cooler and the household water supply, and enables the assembly to be removed and replaced with only horizontal movement, thereby eliminating need for vertical clearance space usually required for conventional filters. The connection is made by a single bolt, permitting quick removal and reinstallation when the filter elements in the assembly are changed.

SUMMARY OF THE INVENTION

Briefly stated, the filtration assembly of this invention includes a filter housing with a closure cover removably secured to the housing. The cover defines inlet and outlet conduits for circulating fluid through the filter housing, and the conduits terminate at a first set of ports or openings in a substantially vertical face of an integrally formed boss on the cover. An adapter block has inlet and outlet conduits arranged for connection to fluid supply and delivery lines, and these conduits terminate in a second set of ports or openings in a substantially vertical face of the block.

The first and second sets of openings are spaced to be in mating alignment, and one set is encircled by domed convex seats on the associated vertical face. The other set of openings is encircled by seal members (preferably O-ring seals) which are captively retained in recesses in the associated vertical face. A fastening means, preferably a single threaded fastener, is used to secure the block to the cover with the seals in face-seal engagement with the domed seats.

When used as a filter in a water-chilling system, the assembly preferably includes a modular filter having an outer cylindrical shell of porous polyethylene plastic. An inner tube of the same material is positioned coaxially within the shell, and the space between the inner porous tube and shell is filled with a two-stage filter having a body of activated-charcoal granules and a solid core of bonded activated charcoal. Water flows through the outer shell inwardly through the charcoal filters and inner porous tube into a perforated outlet tube connected to the housing cover and positioned within the inner porous tube.

BRIEF DESCRIPTION OF THE DRAWINGS

FIG. 3 is a top view of a housing cover used in the assembly and a sectional view of an adapter block installed on the cover;

FIG. 4 is a side elevation of the housing cover partly broken away and on line 4—4 of FIG. 3;

FIG. 5 is an elevation of an adapter block on line 5—5 of FIG. 3; and

FIG. 6 is an end view of the adapter block.

DESCRIPTION OF THE PREFERRED EMBODIMENTS

Figure 1:
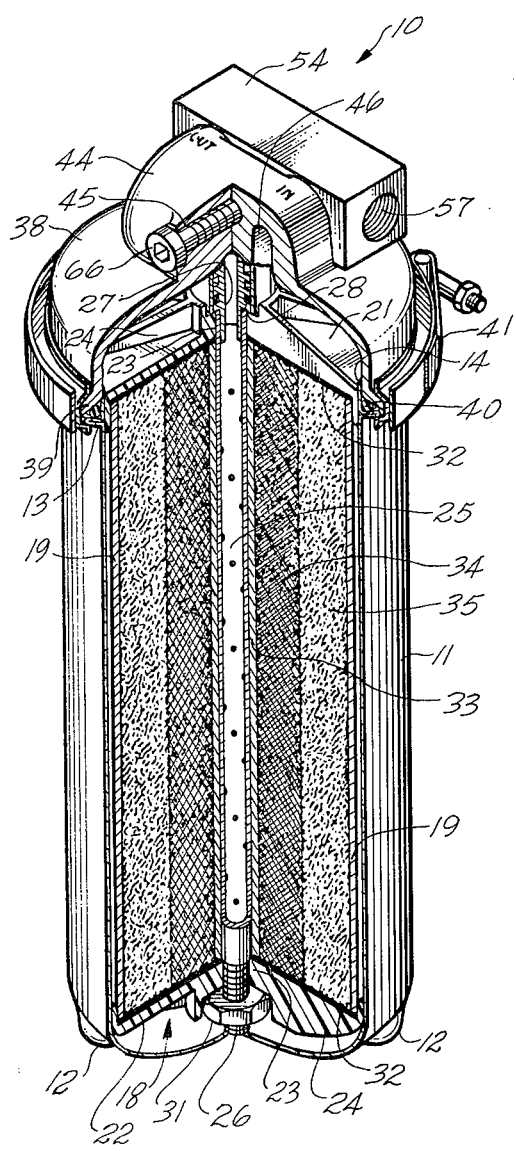
FIG. 1 is a perspective view, partly broken away, of a filtration assembly according to the invention.
Figure 2:
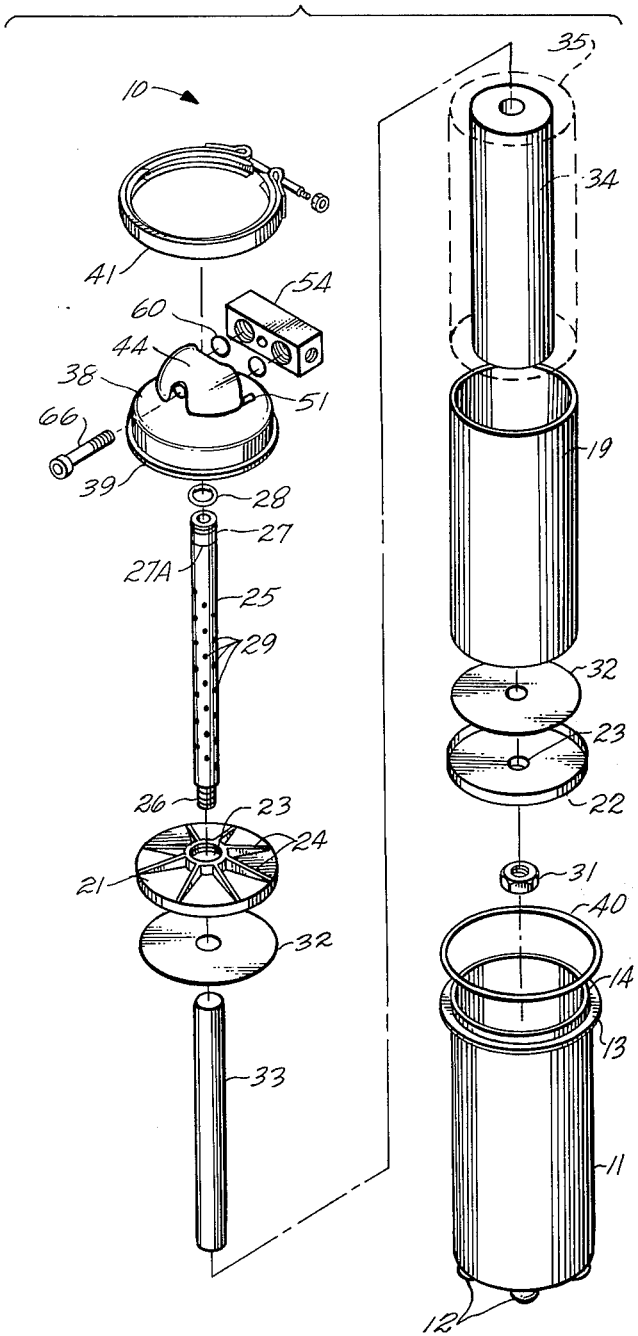
FIG. 2 is an exploded view of the components of the filtration assembly.

A filtration assembly 10 according to the invention is shown in FIGS. 1–2. The assembly includes a cylindrical shell or housing 11 which is preferably deep drawn from stainless steel for corrosion resistance. The housing is closed at its lower end, and includes integrally formed dimpled feet 12 which rest on the floor and support the assembly.

An upwardly and outwardly extending continuous annular flange 13 is integrally formed adjacent the upper end of housing 11. A short annular rim 14 extends above the flange and defines the upper end of the housing.

A modular filter 18 is cylindrical in shape, and makes a loose slip fit within housing 11 so a clearance space exists between the outer surface of the filter and the inner surface of the housing. The filter includes a cylindrical shell 19 made of porous polyethylene plastic having a pore size of approximately 30 to 50 microns. The plastic shell is preferably about ⅛ inch thick to provide adequate rigidity and strength. As explained below, shell 19 is both a housing for additional internal filter elements, and is also a first-stage filter for water flowing through the filtration assembly.

A pair of upper and lower end caps 21 and 22 makes snug fits over opposite ends of shell 19. Each end cap includes a central circular opening 23, and the caps are preferably molded from ABS plastic or glass-filled poly-carbonate plastic with integrally formed stiffening ribs 24. As shown in FIG. 1, the bottom of lower end cap 22 rests on the inside bottom surface of housing 11 when filter 18 is installed in the housing.

An outlet tube 25 (preferably made from polyvinyl chloride or glass-filled polycarbonate plastic) is centrally positioned within cylindrical shell 19, and is closed at its lower end by a plug 26 having a threaded lower end which extends through opening 23 in lower end cap 22. A hollow cylindrical fitting is secured within the upper end of tube 25 and the fitting extends above the top of the tube. The fitting has an outwardly extending annular flange 27A at the top of the tube, and a recess just above flange 27A receives an O-ring seal 28. The tube makes a snug slip fit through opening 23 in upper end cap 21, and flange 27A abuts the top of the upper end cap.

A plurality of perforations 29 extend through the wall of outlet tube 25 between upper and lower end caps 21 and 22. A pair of circular gaskets 32 are preferably made from 15-shore neoprene, and are positioned at opposite ends of cylindrical shell 19 to extend from between the shell and end caps 21 and 22 to outlet tube 25. A brass nut 31 is threaded onto lower end 26 and secured snugly to clamp the upper and lower end caps against cylindrical shell 19.

A porous polyethylene tube 33 has a wall thickness of about one-eighth inch and a pore size of about 60 to 80 microns. Tube 33 slips over outlet tube 25 and extends between end caps 21 and 22.

A hollow cylindrical filter element 34 is formed from a block of activated charcoal which is slipped over tube 33 between the end caps. Element 34 is preferably polymer-bonded compressed charcoal with a porosity of about 10 microns.

The remaining space between the outer surface of element 34 and the inner surface of cylindrical shell 19 is filled with a body of granular activated charcoal (14 × 40 mesh granules are suitable) forming a second filter element 35. The entire modular filter 18 can be removed as a unit from housing 11, and a new filter slipped in place when replacement is necessary.

A housing cover 38 (FIGS. 1–4) is preferably made as an integral brass casting, and provides both a lid for the filtration assembly and also fluid-flow conduits leading to the interior of the assembly. Cover 38 makes a snug slip fit over rim 14 of housing 11, and an outwardly and downwardly extending annular flange 39 is integrally formed at the lower end of the cover. An O-ring seal 40 is positioned between cover flange 39 and housing flange 13, and the cover and housing are secured together by a conventional adjustable clamp ring 41.

A central boss 44 extends upward from the top of housing cover 38 and an unthreaded bore 45 extends through the boss generally parallel to the top of the housing cover and perpendicular to the central axis of the cylindrical filtration assembly. An inlet conduit 46 extends from a vertical face 47 of the boss downwardly through the housingcover casting to open into the interior of the filtration assembly above upper end cap 21 of the modular filter.

An outlet conduit 48 is similarly formed through the housing-covered casting to terminate in an opening at the center of the undersurface of the housing cover. A short downwardly extending tube 49 is integrally formed on the undersurface of the housing cover around the outletconduit opening, and the upper end of outlet tube 25 makes a snug slip fit in tube 49. O-ring seal 28 provides a fluid-tight connection between the upper end of tube 25 and tube 49.

Vertical face 47 of central boss 44 defines a pair of domed convex seats 50 surrounding the upper ends of inlet and outlet conduits 46 and 48, and the seats are machined and polished to a smooth surface. The seats are positioned on opposite sides of bore 45, and the upper ends of inlet and outlet conduits 46 and 48 are in horizontal alignment with the axis of bore 45. A pair of integrally formed ledges 51 extend slightly upwardly from the top surface of housing cover 38 below and on opposite sides of seats 50.

An adapter block 54 is preferably made from an elongated bar of square-cross-section cast brass. A central threaded opening 55 extends through the block, and a stainless-steel wire-type threaded insert 56 is screwed into opening 55. This style of insert is commercially available from Heli-Coil Corporation, and it provides a hard, wear-resistant mating surface for threads on an adapter-block coupling bolt to be described below.

A pair of threaded openings 57 are formed in opposite ends of block 54, and extend toward the center of the block to terminate short of central threaded opening 55. A pair of undercut circular recesses 58, spaced to mate with seats 50, are formed in a front face 59 of block 54 on opposite sides of central opening 55. An O-ring seal 60 is fitted into each recess 58, and the seals are captively retained in the adapter block by the undercut shape of the recesses as best seen in FIG. 3. A bore 61 extends from the base of each recess 58 into communication with a respective one of threaded openings 57.

When the filter is installed, adapter block 54 is plumbed into a water line (not shown). The supply end of this line comes from the household water system through a conventional pressure-reducing regulator (not shown), and the delivery end of the line is connected to a chilling unit (not shown) of a water-cooling system. The lines are secured to the adapter block using conventional fittings. The block is positioned above the floor at a height such that O-rings 60 will mate with seats 50 when housing 11 of the filtration assembly is positioned beneath the adapter block on the floor beneath a kitchen sink or in any other locations selected by the user.

After the adapter block has been thus permanently installed in the water system, filtration assembly 10 is positioned on the floor and moved horizontally until seats 49 on housing cover 38 mate with O-rings 60. A fastener such as a cap screw 66 is then passed through bore 45 in central boss 44, and threaded into opening 55 to engage the threaded insert and draw the housing cover and adapter block together in sealed connection.

Water from the household supply line and pressure regulator flows through the adapter block and housing cover into the inside of housing 11 above modular filter 18. The water then flows downwardly into the annular space between the outer surface of the filter and the inner surface of shell 19, and large particulates are screened out of the water as it flows through the porous outer shell of the filter. Further filtering and decontamination of the water is provided by the charcoal granules and solid charcoal core within the filter. Tube 33 supports the inner face of the charcoal core, and transmits water from the charcoal core to outlet tube 25, and also prevents any fragments of charcoal from entering the outlet stream of fluid in tube 25. The filtered water then flows upwardly through the outlet tube and housing cover, and into the outlet end of the adapter block to be delivered to the chilling unit.

The filter elements described above in modular filter 18 have a typical life of about six months. When the filter is to be changed, housing 11 and cover 38 are withdrawn as a unit by removing cap screw 66 to release the assembly from the adapter block. The housing and cover are withdrawn to a convenient working space where clamp ring 41 is released and the cover is removed so the old filter can be withdrawn as a unit. A fresh filter is then inserted, and the above steps are followed in reverse order to reinstall the unit.

Reinstallation is particularly simple because the housing need only be slipped along the floor without any attention being paid to vertical alignment. Ledges 51 guide the adapter block against the housing-cover seats, and when cap screw 66 slips into opening 55, it is only necessary to tighten the screw to provide quick and simple fluid-type connection of the adapter block and housing cover.

There has been described a compact and easily serviced filtration unit which finds particular utility in household-water chilling system. The usefulness of the assembly, however, is not restricted to this specific application, and the quick-coupling arrangement finds application in a variety of situations requiring quick and simple disconnection and re-connection of fluid conduits.

What is claimed is:

1. A filtration assembly, comprising an upright filter housing adapted to rest on a floor, and having an open upper end adapted to receive a replaceable modular filter;

a cover removably secured to and closing the upper end of the housing, the cover defining inlet and outlet conduits for circulating fluid through the housing, the conduits terminating at a first set of openings in a substantially vertical face of the cover;

an adapter block having inlet and outlet conduits adapted for connection to fluid supply and delivery lines, the conduits terminating at a second set of openings in a substantially vertical face of the block;

the first and second sets of openings respectively being substantially in mating alignment, one of the sets of openings being encircled by domed convex seats defined by the associated vertical face, and the other set of openings being encircled by resilient seals captively retained in recesses in the associated vertical face, whereby the assembled housing and cover can be fluid connected to and unconnected from the adapter block by horizontal movement of the housing and cover along the floor, and without requiring additional vertical clearance space; and means for securing the block to the cover so the seals are urged together in mating engagement, whereby the domed convex seats effect a face seal against said seals and around the respective sets of respective openings.

2. The assembly defined in claim 1, and further comprising a modular filter configured to fit into the housing, the filter including a porous outer shell, a porous tube fitted within the shell, an activated charcoal filter disposed between the tube and shell, the filter having an outer body of activated charcoal granules, and an inner body of compressed and bonded activated charcoal, a pair of caps secured at opposite ends of the tube and shell, and a perforated outlet tube disposed within the porous tube and extending through one of the caps into communication with the cover outlet conduit, the charcoal filter and porous shell each providing filtration of fluid passing through the shell inwardly through the filter to the outlet tube, and the porous tube preventing migration of charcoal fragments into the outlet tube.

3. The assembly defined in claim 2 wherein the porous shell is polyethylene plastic with porosity in the range of 60–80 microns, and the porous tube is polyethylene plastic with porosity in the range of 60–80 microns.

4. The assembly defined in claim 3 wherein the means for securing the block to the cover is a single threaded fastener.

5. The assembly defined in claim 1 wherein the domed seats are formed on the vertical face of the cover, and wherein the block recesses are undercut, the seals being resilient O-ring seals fitted into the undercut recesses to be substantially flush with the vertical face of the block.

* * * * *